Figure 1:
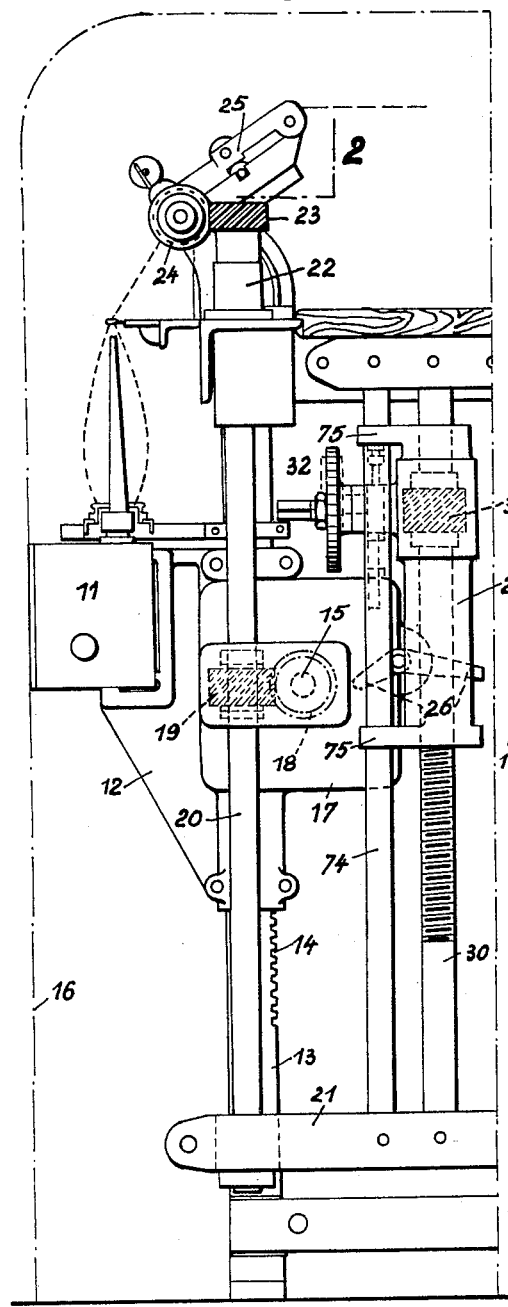

Feb. 13, 1934.    J. J. KEYSER    1,946,699
DEVICE FOR LIFTING AND LOWERING THE SPINDLE AND RING BEAMS
OF SPINNING, TWISTING, AND THE LIKE MACHINES
Filed May 27, 1930    3 Sheets-Sheet 1

INVENTOR
Johann J. Keyser
BY
ATTORNEYS

Feb. 13, 1934.   J. J. KEYSER   1,946,699
DEVICE FOR LIFTING AND LOWERING THE SPINDLE AND RING BEAMS
OF SPINNING, TWISTING, AND THE LIKE MACHINES
Filed May 27, 1930   3 Sheets-Sheet 2

INVENTOR
Johann J. Keyser
BY
ATTORNEYS

Feb. 13, 1934.    J. J. KEYSER    1,946,699
DEVICE FOR LIFTING AND LOWERING THE SPINDLE AND RING BEAMS
OF SPINNING, TWISTING, AND THE LIKE MACHINES
Filed May 27, 1930    3 Sheets-Sheet 3
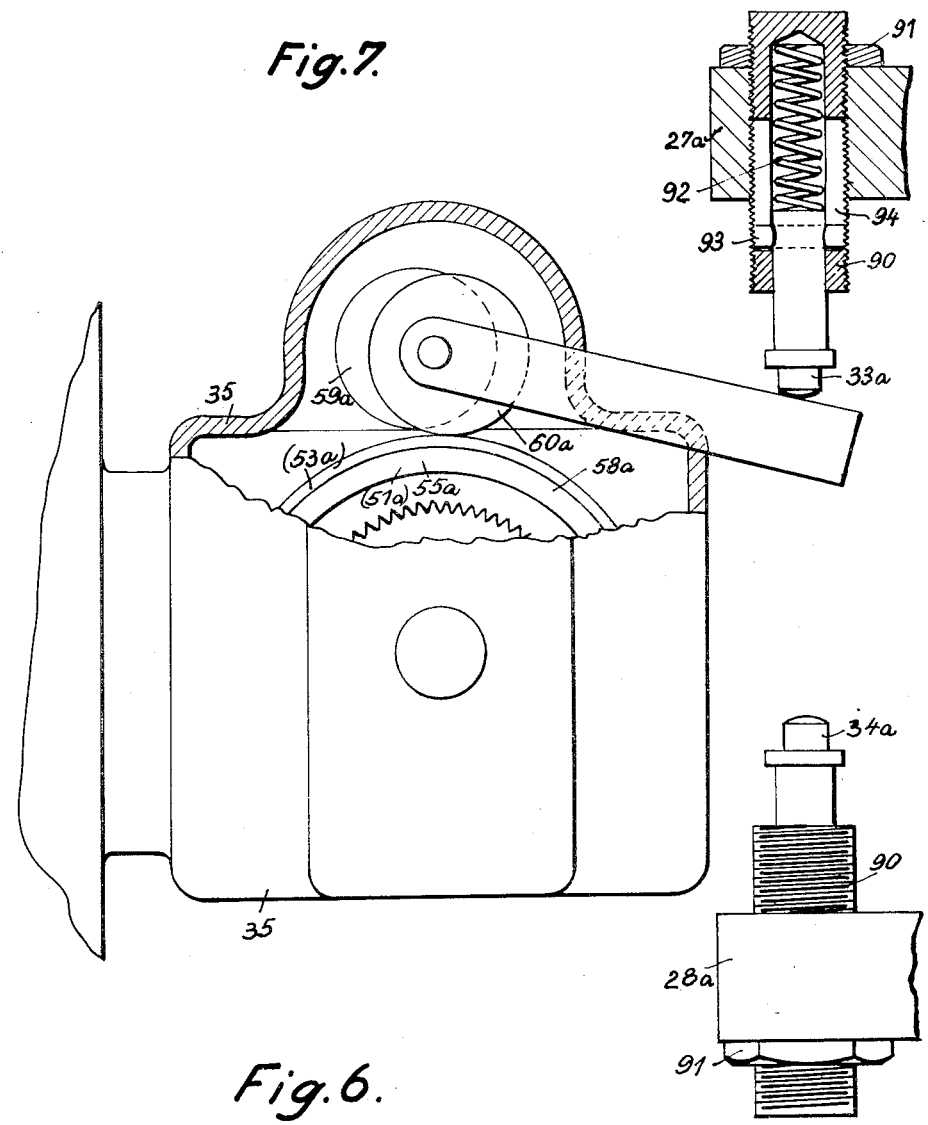
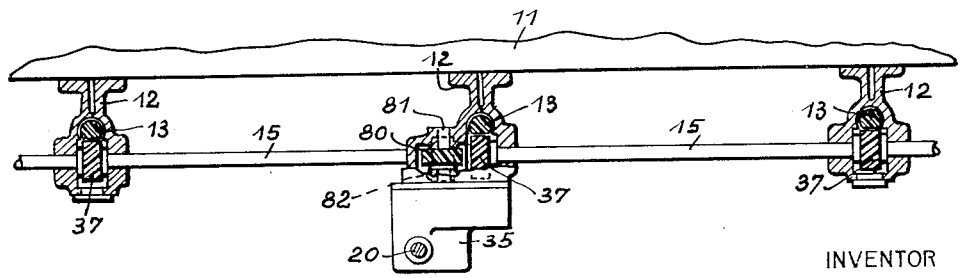
INVENTOR
Johann J. Keyser
BY
ATTORNEYS Patented Feb. 13, 1934

1,946,699

UNITED STATES PATENT OFFICE 1,946,699

DEVICE FOR LIFTING AND LOWERING THE SPINDLE AND RING BEAMS OF SPINNING, TWISTING, AND THE LIKE MACHINES

Johann Jacob Keyser, Aarau, Switzerland

Application May 27, 1930, Serial No. 456,226, and in Germany and Switzerland July 25, 1929

5 Claims. (Cl. 74—14)

This invention refers to a mechanism for lifting and lowering the spindle and ring beams of spinning, twisting and the like mechanism. In the machines of this kind at present in extended use it is usual to provide means for lifting or lowering either the spindle beam or the ring rail so that the cops or bobbins may be produced, the lifting and lowering contrivances being normally operated by the stretch and feed mechanism through the intermediary of a speed changing and reversing gear supported by a stationary part of the machine and acting by means of slowly operating cams, pinions or sprockets on the spindle or ring beam.

This fixed or stationary arrangement of the speed changing and reversing gears has the disadvantage that the transmission from the gear to the member to be operated must be effected by means of a plurality of transmission members which produce a retardation of the transmission when a change of the direction of rotation takes place on account of lost motions, etc., the transmission being particularly difficult, if the members to be moved or operated such as spindle and ring beams are of considerable weight or if machines of a great structural length are used, since in these instances the stationary gears must always be arranged near the main drive of the machine. The gears so far used or proposed further do not permit a shockless transmission, because the stationary reversing mechanisms impart at the moment of reversal to the members on which they are operating a shock-like acting acceleration or retardation which is transmitted to all the transmission members in an increased and various degree, whereby the difficulty of transmission is still further enhanced.

In order to eliminate this drawback of the machines used in prior art I provide, according to this present invention, a reversing mechanism producing the lifting and lowering movement, which may be constructed as a speed changing mechanism imparting different speeds to the beam, when the same is lowered or lifted, directly on the vertically reciprocating spindle or ring beam, so that it moves together therewith, cooperating at all times or positions with only one main driving element supported on the stationary frame of the machine. This arrangement reduces the lost motion to a minimum and the up and down movement can take place in a perfectly unobjectionable way.

My new arrangement has the still further advantage, that the reversing gear must no longer be arranged in the proximity of the machine drive but can be located at any desired point so as to reduce the torsion stress of the beam feeding shaft to a minimum. This effect is still increased by the speed changing and reversing gear being, according to a further feature of my invention, constructed as a planetary gear, the pinion groups of which remain permanently in engagement when the direction of rotation is reversed.

According to a still further feature of my invention the tripping mechanism controlling the speed changing and reversing gear is likewise directly supported by the reciprocating beam, preferably by the gear casing, and arranged for a snap action so as to control said gear instantaneously. Due to this general arrangement my invention is particularly useful in all the instances where a movement of heavy and long elements of machines of the type specified is under consideration.

Figure 2:
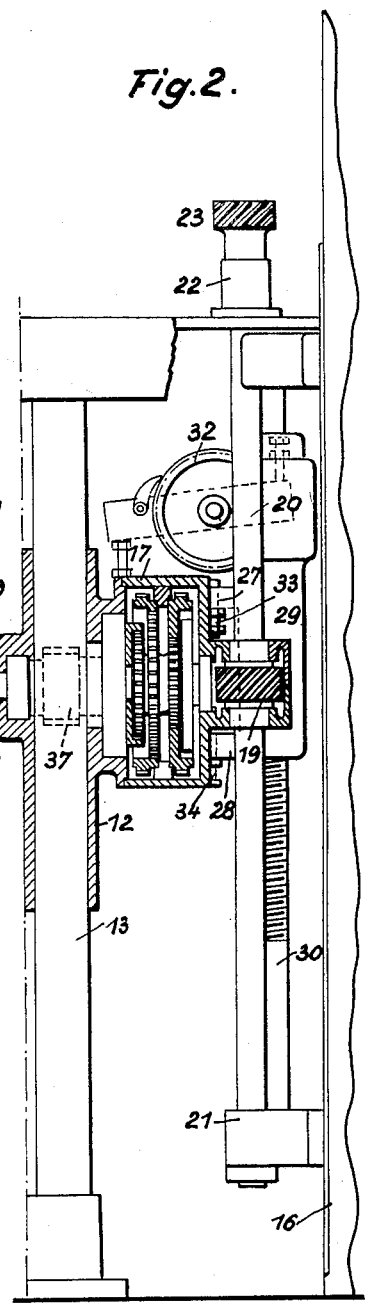
Figure 3:
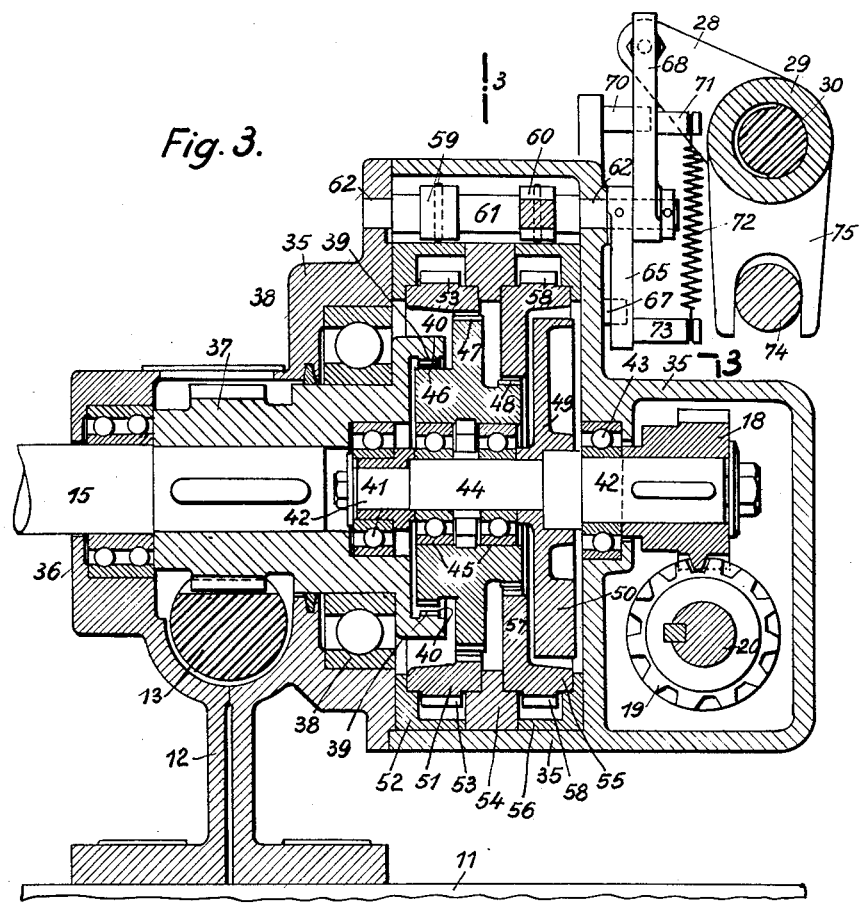
Figure 4:
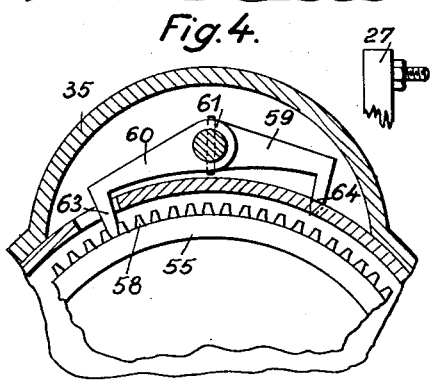

In the drawings illustrating a preferred embodiment of my invention,

Fig. 1 is a sectional side view of a spinning machine constructed according to my present invention, the main machine shield being dismounted, Fig. 2 is a section along line 2—2 of Fig. 1 at right angles to the view shown in that figure, Fig. 3 is a longitudinal section of the speed changing and reversing gear drawn at a larger scale, Fig. 4 is a section along line 3—3 of Fig. 3 through the locking mechanism of the speed changing and reversing gear.

Figure 5:
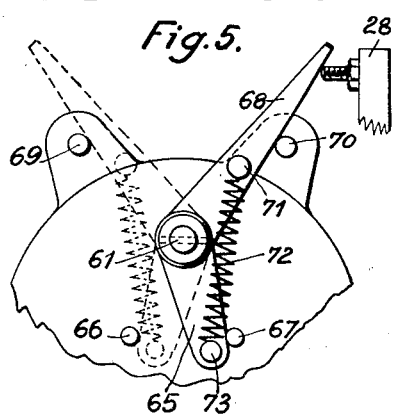

Fig. 5 is a side view of the trigger mechanism controlling the gear locking mechanism, Fig. 6 a diagrammatic view illustrating an embodiment of my invention in which the speed changing and reversing gear is arranged between the ends of the beam shaft, Fig. 7 is a side view in enlarged scale of a modified gear reversing mechanism.

According to Figs. 1 and 2 the spindle beam 11 is supported on and by the brackets 12 sliding on posts or standards 13 and provided with pinions 37 (Fig. 3) which are mounted on a transverse shaft 15 and mesh with racks 14 of the standards 13 in order to lift and lower the beam. On the first bracket 12 adjacent to the main shield 16 of the machine a speed changing and reversing gear is arranged, the main or actuating pinion 18 of which is operated by a worm gear 19 splined on a vertical shaft 20, so as to revolve therewith, but adapted to be axially shifted along said shaft. The shaft 20 is supported in bearings 21 and 22 of the main shield 16 of the machine and carries at its upper end a pinion 23 which is acted upon by the actuating pinion 24 of the feed and stretch mechanism.

The speed changing and reversing gear is controlled by a trip lever system 26 cooperating with stops 27 and 28. As shown in Figs. 1 and 2, these stops 27, 28 are carried by a sleeve 29 slidably arranged upon a stationary screw spindle 30 and adapted to be moved up and down thereon by a rotatable nut 31. This nut is operated by a ratchet wheel 32 actuated by a pawl under the control of the reciprocating beam 11.

In the modification illustrated in Figs. 1 and 2 the stops 27 and 28 are integral with the sleeve 29 and provided with adjustable stop pins 33 and 34. Depending on the shape of the bobbin or cop to be produced the stops 27 and 28 may also be arranged on separate sleeves 29 individually controlled by ratchets 32.

As shown in Figs. 2 and 3 the speed changing and reversing gear comprises a casing 35 fixed to the first bracket 12 and into which the shaft 15 extends which is supported by a ball bearing 36 of bracket 12. The shaft 15 is provided with as many pinions as there are posts or standards 13. The pinion 37 projects into the casing 35, runs on a strong ball bearing 38 and is provided at its front with inner teeth 40.

Within the hub of the pinion 37 a ball bearing 41 supports one end of a shaft 42 arranged coaxially with the shaft 15, its other end being supported by a ball bearing 43 within the casing 35. The shaft 42 carries at this end the worm gear 18 meshing with the worm 19 of the vertical shaft 20. The intermediate portion 44 of the shaft 42 is eccentrically located with relation to the worm gear 18 and carries on two ball bearings 45 a group of pinions having the spurs 46, 47 and 48. The spur 46 rolls over the inner teeth 40 of pinion 37, 39, if the eccentrical portion 44 is performing its orbitary movement around the axis of shaft 42. Since the pinions 46, 47, 48 are eccentrical with relation to shaft 42 I arrange on shaft 42 a fly wheel 49 having a balancing counterweight 50. As shown in the drawings, the pinions 46, 47, 48 constituting a revolving pinion block and the planetary element of the mechanism have different diameters, the diameter of pinion 48 being smaller and the diameter of pinion 47 being greater than the diameter of pinion 46, which meshes with pinion 37, 39, as stated.

The pinion 47 meshes with the teeth of a ring 51 running on a guiding ring 52 of the casing 35 and carrying at its periphery a locking mechanism 53 by which the ring 52 may be locked against rotation. Within the casing 35 a further ring 55 is arranged and spaced from ring 51 by a spacing member 54, the ring 55 sliding on a ring 56 of the casing 35 and being provided with inner teeth 57 which mesh with pinion 48. At its outer periphery the ring 55 is provided with locking teeth 58 also adapted to lock it against rotation.

In order to lock the rings 52 and 55 against rotation I arrange two pawls 59, 60 on a trip lever shaft 61 supported by the bearings 62 of the casing 35 (Figs. 3, 4 and 5). The pawls 59, 60 are provided with locking teeth 63, 64 and are under the control of the trip lever system 26 so as to alternately engage the locking teeth 53 and 58 of the rings 51 and 55. The trip lever system 26 comprises a lever 65 mounted on shaft 61, the lever movements being limited by the locking teeth 63, 64 or by stops 66, 67 or by both means simultaneously. Shaft 61 is further loosely carrying a second lever 68, the rocking movements of which are limited by stops 69, 70 and which is provided with a lug 71 to which the one end of a spring 72 is attached, whereas the other spring end engages with a pin 73 of lever 65. This second lever 68 cooperates with the stops 27 and 28 of sleeve 29 guided at its vertical movements by a rod 74 and forks 75.

The operation of the mechanism is as follows:

To produce cops or bobbins having a tapering tip or cone, it is necessary that the spindle beam 11 and the worm gear actuated spindles carried by it be lifted and lowered a distance corresponding to the length of the conical bobbin tip. This lifting and lowering is preferably effected with different speeds so as to obtain a crossing of the thread windings. At the end of each stroke a feeding movement must be imparted to the simple beam displacing the starting point of the lifting and lowering movement in accordance with the growth of the bobbin in such a way, that the spindle beam starts its lifting and lowering movement at successively lower points. Obviously the same holds good, if the ring rail effects its lifting and lowering movement, it being understood that in such instance, the ring rail starts its strokes at successively higher points.

If the beam 11 is vertically reciprocated on the columns 13 by the pinions 37 the gear box 17 moves together with the spindle beam, the actuating gear 19 sliding up and down on the vertical shaft 20 by which it is rotated. At the upstroke of beam 11 and gear box 17 the arm 68 of the strip lever system 26 engages with stop 27, whereby the gear 17 is instantaneously reversed at a definite point so that the beam will be lowered. As soon as the beam 11 approaches its lower end position, the lever 68 encounters the stop 28 which arrests and tilts the lever 68 at the required movement, so that the beam again starts its upward stroke. Prior to or after each reversal of the beam the ratchet wheel 32 is advanced to a certain degree by any known or suitable feeding mechanism not shown, in order to continuously adjust or displace the beginning of the lifting and lowering movement.

The speed changing and reversing gear is acting as follows:

The pinion 19 is actuating the pinion 18 so that the shaft 42 and its eccentrical portion 44 are rotated in always the same direction around the axis of the shaft 42. The pinions 46, 47, 48 mounted on the eccentrical shaft portion have a plurality of teeth which are but slightly smaller than those of the toothed rims 39, 51 and 55 with which they cooperate.

If the toothed ring 51 is restrained from rotation by pawl 59, the pinion 47 the diameter of which is greater than that of pinion 46, is rolling over the inner tooth-rim of ring 51, and as pinion 46 rotates in the same direction as pinion 47, the gear 39 will perform a rotary movement in one direction, said movement being considerably slower than the movement of gear 18, so that the spindle beam is for example slowly lifted. If however the toothed ring 55 is locked by pawl 60 and the ring 51 simultaneously released, the smaller pinion 48 is rolling over the inner teeth 57 of ring 55 so that gear 37, 39 will now, due to the reversal of the diameter relations and although pinion 46 is continuing to rotate in the same direction, be rotated in the reverse direction and the beam will be lowered now for example, this movement being carried out with an increased speed. By suitably selecting the sizes of pinions 46, 47 and 48 and of the toothed elements cooperating therewith, one can obtain any desired ratio of transmission so that, for example, the lifting movement is performed in a slow and the lowering movement is performed in a more rapid way, or inversely, as will be readily understood.

In Fig. 6 I have illustrated an embodiment which differs from the embodiment Figs. 1–5 wherein the speed changing and reversing gear is arranged at the end of the beam reciprocating shaft, so that said gear is located in the middle of the machine. This gear location is of particular use for long and heavy machines. According to this embodiment I mount for example, on the beam shaft a worm or bevel pinion 80 and on the driven shaft of the speed changing and reversing gear arranged at an angle of 90° to shaft 15 a worm or bevel pinion 82 in mesh with pinion 80, the gear being again actuated by the vertical shaft rotated in a steady direction by the feed and stretch mechanism of the machine. When the shaft 20 is rotated it imports through the intermediary of pinions 80, 82 to shaft 15 a right or left handed rotation, so that the beam 11 is rolling over the toothed standards 13 either lifted or lowered by the pinions 37.

Instead of the reversing mechanism shown in Figures 1–5 the modified construction of such mechanism illustrated in Fig. 7 may also be used with good result. In this embodiment the rings 51a and 55a are not provided on their outer periphery with pinions 53 and 58, instead of which I arrange smooth surfaces 53a and 58a respectively, with which two eccentric cams 59a and 60a cooperate. The same are supported on a shaft 61a carried by the casing 35a, the centers of both cams being located on opposite sides of the shaft 61a and so arranged with relation to the rings 51a and 55a that they are automatically firmly pressed against the said rings by the turning moment thereof, when they are brought into engagement with their coordinated ring.

The shaft 61a is carrying a lever 68a cooperating with resilient stops 33a and 34a. These stops are carried within hollow screws 90 adjustably arranged in the stop arms 27a and 28a and locked by nuts 91 in their positions, the lengthwise movement of the stops 33a and 34a being limited by pins 93 guided within slots of the screws 90. Within the screws 90 I arrange springs 92 having such a strength, that they are adapted, upon attaining a certain tension, to overcome the friction between the cams 60a, 59a and the rings 51a, 55a respectively and to effect the engagement of the other cam with its ring, so that the cam gets at once a firm hold on the said ring. This operation is repeated upon engagement with stop 34a of arm 28a, as will be readily understood.

What I claim is:

1. In a device of the character described, a stationary vertical beam guide, a support slidable on said beam guide, a horizontal beam carried by said support, a driving gear carried by said support and movable therewith, said gear comprising a rotary member engaging said beam and means cooperating with said member for driving it in different directions and with different speeds; and means cooperating with the first-mentioned means for actuating the same.

2. In a device of the character described, a stationary vertical beam guide, a support slidable on said beam guide, a horizontal beam carried by said support, a rotary member engaging said beam guide, a shaft rigidly connected with said member and carried by said support, a speed changing and reversing gear carried by said support and driving said rotary member, a rotary shaft, a member carried by the last-mentioned shaft and driving said gear, and stationary stops cooperating with said gear for reversing the rotation of the first-mentioned rotary member.

3. In a device of the character described, a stationary vertical beam guide provided with teeth, a support slidably mounted on said beam guide, a horizontal beam carried by said support, a toothed wheel engaging the teeth of said beam guide, a shaft carrying said wheel and carried by said support, another shaft carried by said support, a toothed wheel mounted on the second-mentioned shaft and rotatable therewith, another toothed wheel mounted on the second-mentioned shaft eccentrically with respect to the second-mentioned wheel and adapted to engage the first-mentioned wheel, a ring adapted to engage the third-mentioned wheel, means carried by said support for locking said ring, stationary stops adapted to engage said means for actuating the same, and means for rotating the second-mentioned wheel.

4. In a device of the character described, a stationary vertical beam guide provided with teeth, a support slidably mounted on said beam guide, a horizontal beam carried by said support, a toothed wheel engaging the teeth of said beam guide, a shaft carrying said wheel and carried by said support, another shaft carried by said support, a toothed wheel mounted on the second-mentioned shaft and rotatable therewith, another toothed wheel mounted on the second-mentioned shaft eccentrically with respect to the second-mentioned wheel and adapted to engage the first-mentioned wheel, a ring adapted to engage the third-mentioned wheel, another ring adapted to engage the third-mentioned wheel, means carried by said support for locking at least one of said rings, stationary stops adapted to engage said means for actuating the same, and means for rotating the second-mentioned wheel.

5. In a device of the character described, a stationary vertical beam guide provided with teeth, a support slidably mounted on said beam guide, a horizontal beam carried by said support, a toothed wheel engaging the teeth of said beam guide, a shaft carrying said wheel and carried by said support, another shaft carried by said support, a toothed wheel mounted on the second-mentioned shaft and rotatable therewith, another toothed wheel mounted on the second-mentioned shaft eccentrically with respect to the second-mentioned wheel, a ring, another ring, means carried by said support for slidably supporting said rings, the third-mentioned wheel being provided with a toothed portion having a large diameter and engaging one of said rings, a toothed portion of a smaller diameter engaging the first-mentioned wheel, and a toothed portion of a still smaller diameter engaging the other one of said rings, means carried by said support for alternately locking one of said rings, stationary stops adapted to engage said means for actuating the same and means for rotating the second-mentioned wheel.

JOHANN JACOB KEYSER.